April 11, 1939.  E. R. SINCLAIR  2,154,015
BRAKE LINING STRETCHER
Filed May 4, 1936  2 Sheets-Sheet 1

INVENTOR
EDWARD R. SINCLAIR
ATTORNEYS

April 11, 1939.  E. R. SINCLAIR  2,154,015
BRAKE LINING STRETCHER
Filed May 4, 1936  2 Sheets-Sheet 2
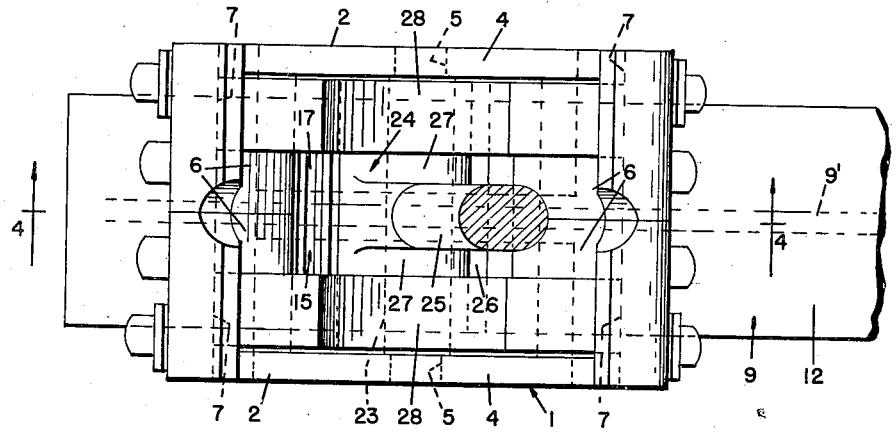
FIG.3.
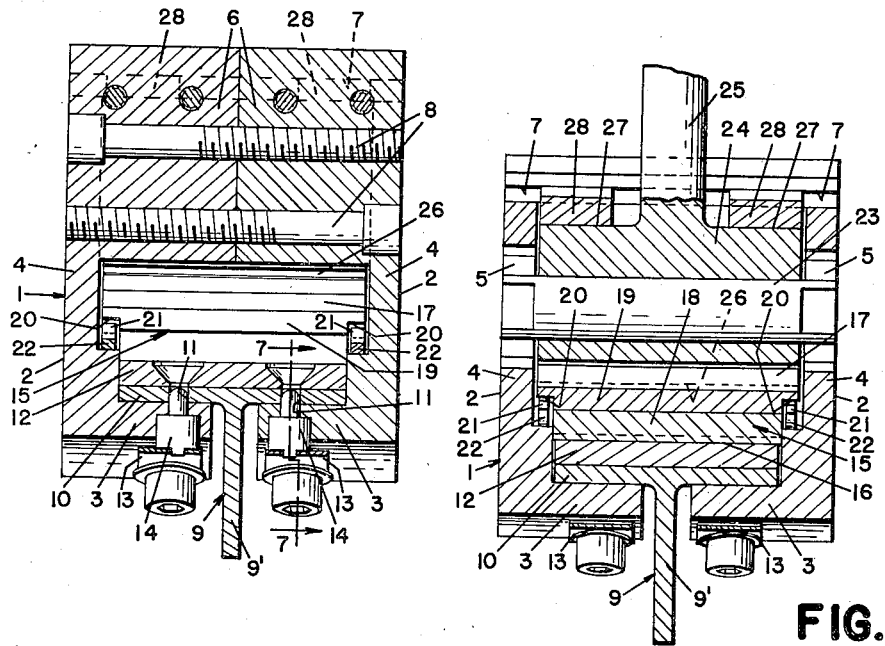
FIG.6.
FIG.5.
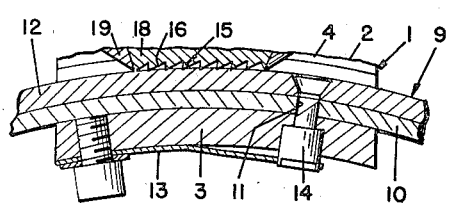
FIG.7.
INVENTOR
EDWARD R. SINCLAIR
BY
ATTORNEYS Patented Apr. 11, 1939

2,154,015

UNITED STATES PATENT OFFICE 2,154,015

BRAKE LINING STRETCHER

Edward R. Sinclair, Detroit, Mich., assignor to Kelsey-Hayes Wheel Company, Detroit, Mich., a corporation of Delaware Application May 4, 1936, Serial No. 77,868

6 Claims. (Cl. 29—84)

The invention relates generally to brake lining structures and refers more particularly to fixtures, or devices commonly known as brake lining stretchers, for stretching or making taut linings upon brake elements during their assembly.

The invention has for one object to provide an improved construction of brake lining stretcher which may be readily applied to and removed from a brake element. The invention has for other objects to provide a stretcher which will grip a lining without objectionably marring the same; to provide a stretcher which will allow for commercial variations in thicknesses of both the lining and the brake element; and to provide a stretcher in which the lining gripper is adapted to be moved toward the lining with a predetermined force.

These and other objects of the invention will become apparent from the following description, taken in connection with the accompanying drawings, in which Figure 1 is a side elevation illustrating a brake lining stretcher embodying my invention;

Figures 2 and 3 are respectively end and plan view thereof;

Figure 1:
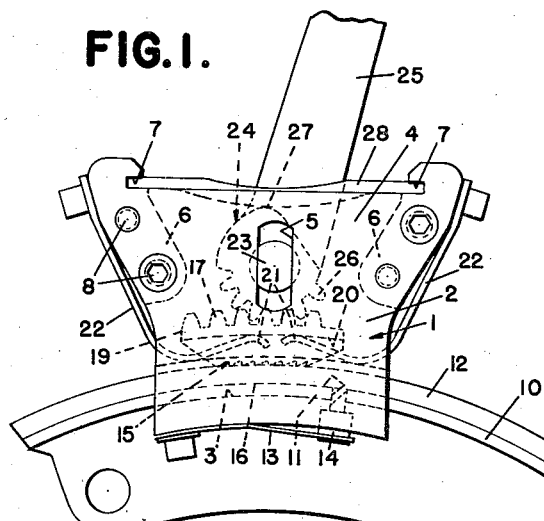
Figure 2:
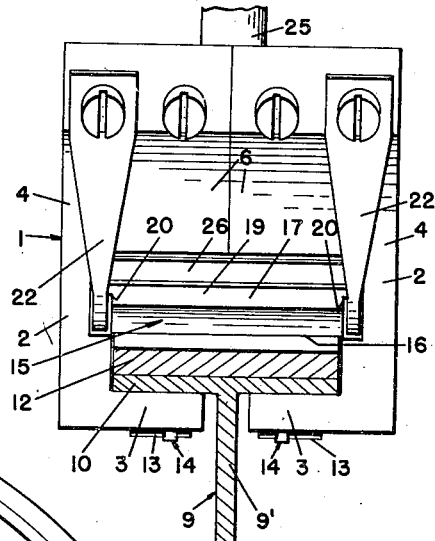
Figure 4:
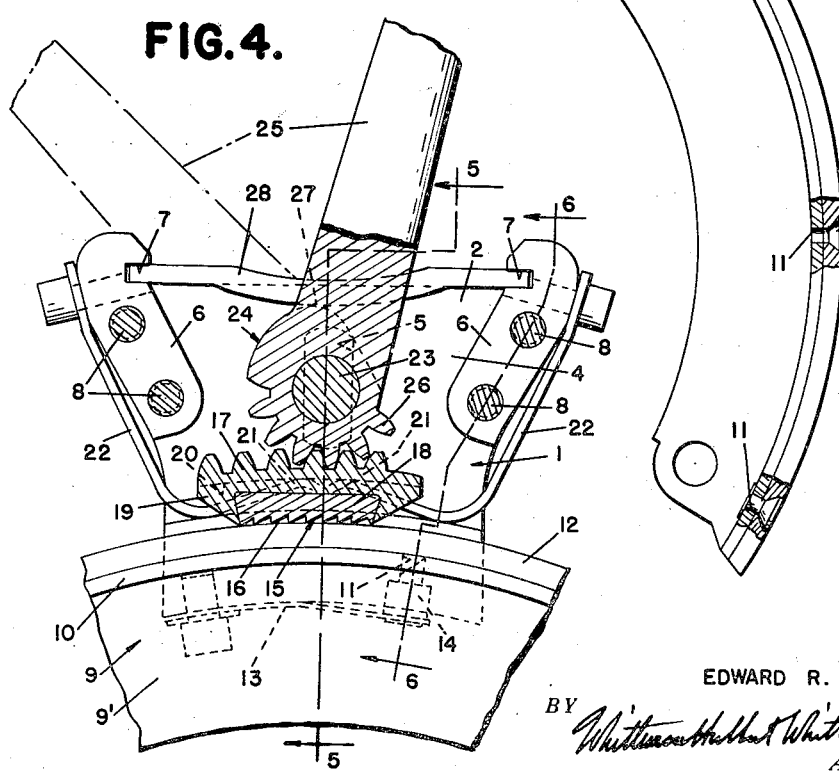
Figure 4 is a cross section on the line 4—4 of Figure 3.

Figures 5 and 6 are cross sections on the lines 5—5 and 6—6 respectively of Figure 4;

Figure 7 is a cross section on the line 7—7 of Figure 6.

The fixture or device embodying my invention is designed to stretch or make taut linings while they are being secured to backing elements. As shown, the fixture or device is a brake lining stretcher for stretching or making taut linings upon brake elements, such as brake shoes.

The brake lining stretcher has the body 1 which is formed of the cooperating sections 2 which are of generally L-shaped transverse cross section. More particularly, each section 2 has the bottom transverse flange 3 which extends toward and is spaced from the bottom transverse flange of the other section. Each section also has the side wall 4 which is provided with the middle vertically extending slot 5. Each section also has at its opposite ends the transverse lugs 6 having their lower ends terminating above the bottom flanges 3 and their upper ends provided with the lateral slots 7 opening toward each other. These lugs 6 are bored to receive suitable means, such as the bolts 8, for securing the sections 2 together, the lugs at this time abutting each other and the bottom transverse flanges being spaced apart. The construction is such that the body is adapted to receive a brake element 9 of T-shaped cross section with the transverse flanges 10 of the T above the bottom transverse flanges 3 and the web or flange 9' of the T extending between the spaced ends of these bottom transverse flanges. The brake element, as shown, is an arcuate brake shoe and the bottom transverse flanges 3 are made arcuate in a longitudinal direction and with a radius substantially equal to that of the brake shoe. It will be noted that the brake shoe and lining extend through the spaces between the bottom transverse flanges and the end lugs. The transverse flanges 10 are provided with longitudinally spaced holes 11 which are adapted to register with corresponding holes formed in the brake lining 12 when the latter has been properly stretched over the upper faces of the transverse flanges 10. These holes 11 are made use of to secure the body and the brake shoe together, each of the body sections 2 having secured to the lower side of its bottom transverse flange 3 the longitudinally extending spring 13 which carries at its free end the plunger 14 engageable in a hole.

The stretcher also has the lining gripper 15 which is located between the side walls 4 of the body sections and above the bottom transverse flanges 3. This gripper has the arcuate series of teeth 16 on its under side and the arcuate rack 17 on its upper side. As shown, the teeth 16 are formed on the insert 18, which latter is carried by the body 19 having the rack 17. The body 19 has the lateral shoulders 20 at its opposite sides which project laterally beyond the insert and which are engageable with the end portions 21 of the springs 22, these springs being secured at their upper ends to the upper portions of the lugs 6 and extending beneath the lower ends of these lugs and inwardly to zones adjacent each other near the longitudinal middle of the body 1. These springs are constructed to yieldably hold the gripper above the brake lining 12 to clear the same.

23 is a shaft having opposite flattened ends engageable in the vertically extending slots 5 and 24 is a rotatable actuator for the gripper journaled upon the shaft 23 between the side walls 4 of the sections 2. This actuator is provided with the central handle 25 and has the arcuate series of teeth 26 concentric with the axis of the shaft and engageable with the teeth of the rack 17. The actuator also has at opposite sides of the handle 25 and at the side of the axis of the shaft opposite the arcuate series of teeth the cams 27. 28 are springs having their ends engageable in the lateral slots 7 and having their intermediate portions bowed downwardly, these springs being located at opposite sides of the handle 25 and in position to engage the cams 27 upon rotation of the actuator 24 through the medium of the handle.

In operation, a brake shoe having a lining secured to one of its ends may be inserted endwise into the stretcher to a position such that the stretcher will be located at the end of the shoe and lining other than that at which the lining is secured to the shoe. The position will also be such that the spring pressed plungers 14 will engage holes 11 in the transverse flanges 10 of the brake shoe. At this time the gripper teeth 16 will clear the lining by reason of the springs 22 yieldably holding the gripper in an upper position. Swinging the handle 25 from the position indicated in dotted lines in Figure 4 in a clockwise direction compels the gripper to move longitudinally in a direction to stretch or make taut the lining. At the same time the cams 27 of the gripper actuator coming into engagement with the springs 28 compel the actuator to move downwardly to thereby force the gripper into contact with the lining against the resistance offered by the springs 22. As a result, it will be seen that the gripper is brought into gripping relation with the lining and moved in a direction to stretch or make taut the lining and the stretching continues until the proper holes in the lining are brought into registration with holes in the transverse flanges of the brake shoe, at which time suitable rivets may be inserted through these lined holes and clinched over. It will be noted that the gripper actuator is yieldably forced toward the lining by spring means adapted to exert a predetermined pressure so that commercial variations in thicknesses of the transverse flanges of the shoe and the lining produce no harmful or injurious effect.

What I claim as my invention is:

1. In a brake lining stretcher, the combination with a body adapted to be secured to a brake element, of a gripper adapted to engage a lining for the element, means movable toward the lining and engageable with said gripper for moving the latter in a direction to stretch the lining, and yieldable means for urging said gripper moving means toward the lining.

2. In a brake lining stretcher, the combination with a body adapted to be secured to a brake element, of a gripper adapted to engage a lining for the element, means upon the body for yieldably urging said gripper in a direction to clear the lining, means for moving said gripper in a direction to stretch the lining, and means operable upon operation of said gripper moving means for urging said gripper toward the lining.

3. In a brake lining stretcher, the combination with a body adapted to be secured to a brake element, of a gripper adapted to engage a lining for the element, means upon said body for yieldably urging said gripper in a direction to clear the lining, means for moving said gripper in a direction to stretch the lining, said gripper moving means being movable toward the lining, and means operable upon operation of said gripper moving means to urge the latter toward the lining.

4. In a brake lining stretcher, the combination with a body adapted to be secured to a brake element, of a gripper adapted to engage a lining for the element, means for moving said gripper in a direction to stretch the lining, and spring means upon said body and engageable with said gripper moving means to move the same in a direction to engage said gripper with the lining.

5. In a brake lining stretcher, the combination with a body adapted to be secured to a brake element, of a gripper having toothed means at one side for engaging a lining for the element, and a rack at the other side, a shaft upon said body movable in a direction transversely of said gripper and the lining, a member upon said shaft having an arcuate series of teeth engageable with said rack and also having a cam, and a spring upon said body engageable with said cam upon rotation of said member.

6. In a brake lining stretcher, the combination with a body adapted to be secured to a brake element, of a gripper having teeth at one side engageable with a lining for the element and having a rack at the other side, spring means upon said body for normally urging said gripper in a direction to clear the lining, a rotatable member having its axis movable in a direction transversely of said gripper and the lining, said rotatable member having an arcuate series of teeth engageable with said rack and a cam, and a spring upon said body engageable with said cam upon rotation of said rotatable member.

EDWARD R. SINCLAIR.